(12) United States Patent
Mulhern et al.

(10) Patent No.: US 7,344,155 B2
(45) Date of Patent: Mar. 18, 2008

(54) ADJUSTABLE ANTI-TIP WHEELS FOR POWER WHEELCHAIR

(75) Inventors: James P. Mulhern, Hunlock Creek, PA (US); Ronald J. Levi, Courtdale, PA (US); George Lewis Leitner, Jr., Tresckow, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 79 days.

(21) Appl. No.: 11/190,520

(22) Filed: Jul. 27, 2005

(65) Prior Publication Data

US 2005/0257966 A1    Nov. 24, 2005

Related U.S. Application Data

(63) Continuation of application No. 10/139,191, filed on May 6, 2002, now Pat. No. 6,923,278.

(51) Int. Cl.
*B60R 21/00* (2006.01)
(52) U.S. Cl. .................. 280/755; 280/250.1; 297/310
(58) Field of Classification Search ............. 180/65.1, 180/907, 6.5, 6.48, 209; 280/304.1, 293, 280/767, 250.1, 755; 297/423.26, 423.34, 297/423.36, DIG. 4, DIG. 10, 310
See application file for complete search history.

(56) References Cited

U.S. PATENT DOCUMENTS

| | | | |
|---|---|---|---|
| 1,773,254 A | 8/1930 | Becker | |
| 2,767,995 A | 10/1956 | Stout | |
| 3,104,112 A | 9/1963 | Crail | |
| 3,282,605 A | 11/1966 | Nihlean et al. | |
| 3,580,591 A | 5/1971 | Coffey | |
| 3,848,883 A | 11/1974 | Breacain | |
| 3,938,608 A | 2/1976 | Folco-Zambelli | |
| 4,513,832 A | 4/1985 | Engman | |
| 4,515,385 A | 5/1985 | Christian | |
| 4,542,918 A | 9/1985 | Singleton | |

(Continued)

FOREIGN PATENT DOCUMENTS

FR    2215054    8/1974

(Continued)

OTHER PUBLICATIONS

U.S. Appl. No. 09/765,022, filed Jan. 2001, Watkins.

*Primary Examiner*—J. A Shriver
(74) *Attorney, Agent, or Firm*—DLA Piper US LLP

(57) ABSTRACT

A power wheelchair is provided having one or more anti-tip wheels for stabilizing the movement of the frame about the drive wheels. An anti-tip wheel is attached to the end of a suspension arm which is pivotally attached to the frame of the wheelchair. A spring resiliently supports the anti-tip wheel in a neutral position relative to the ground upon which the drive wheels of the wheelchair normal ride. A retaining system selectively fixes position of the anti-tip wheels relative to the frame. The retaining system employs a plurality of teeth, with one portion disposed in combination with said suspension arm, and at least one other tooth disposed for engaging said one portion to provide unidirectional retention of the position of said suspension arm relative to the frame. The engagement of the teeth to lock the position of the suspension arm may be responsive to the torque generated by the motor.

20 Claims, 8 Drawing Sheets

U.S. PATENT DOCUMENTS

| | | | |
|---|---|---|---|
| 4,721,321 A | 1/1988 | Haury et al. | |
| 4,763,910 A | 8/1988 | Brandli et al. | |
| 5,113,959 A | 5/1992 | Mastov et al. | |
| 5,137,295 A | 8/1992 | Peek | |
| 5,181,733 A | 1/1993 | Tague | |
| 5,209,509 A | 5/1993 | Gay et al. | |
| 5,435,404 A | 7/1995 | Garin, III | |
| 5,485,140 A | 1/1996 | Bussin | |
| 5,531,284 A | 7/1996 | Okamoto | |
| 5,540,297 A | 7/1996 | Meier | |
| 5,575,348 A | 11/1996 | Goertzen et al. | |
| 5,628,377 A | 5/1997 | Le Gloan | |
| 5,701,122 A | 12/1997 | Canedy | |
| 5,772,237 A | 6/1998 | Finch et al. | |
| 5,848,658 A * | 12/1998 | Pulver | 180/65.1 |
| 5,855,387 A | 1/1999 | Gill et al. | |
| 5,904,214 A | 5/1999 | Lin | |
| 5,944,131 A * | 8/1999 | Schaffner et al. | 180/65.1 |
| 5,957,474 A | 9/1999 | Mundy et al. | |
| 5,964,473 A | 10/1999 | Degonda et al. | |
| 6,041,876 A * | 3/2000 | Pulver et al. | 180/65.1 |
| 6,070,898 A * | 6/2000 | Dickie et al. | 280/304.1 |
| 6,073,951 A * | 6/2000 | Jindra et al. | 280/304.1 |
| 6,129,165 A * | 10/2000 | Schaffner et al. | 180/65.1 |
| 6,199,647 B1 * | 3/2001 | Schaffner et al. | 180/65.1 |
| 6,357,793 B1 * | 3/2002 | Dickie et al. | 280/755 |
| 6,460,641 B1 * | 10/2002 | Kral | 180/24.02 |
| 6,494,474 B1 * | 12/2002 | Kramer, Jr. | 280/304.1 |
| 6,533,306 B2 * | 3/2003 | Watkins | 280/304.1 |
| 6,543,798 B2 | 4/2003 | Schnaffer | |
| 6,554,086 B1 * | 4/2003 | Goertzen et al. | 180/65.1 |
| 6,640,916 B2 * | 11/2003 | Schaffner et al. | 180/65.1 |
| 6,776,430 B2 | 8/2004 | White et al. | |
| 6,796,568 B2 | 9/2004 | Martis et al. | |
| 6,851,711 B2 | 2/2005 | Goertzen et al. | |
| 6,923,278 B2 * | 8/2005 | Mulhern et al. | 180/65.1 |
| 6,938,923 B2 | 9/2005 | Mulhern et al. | |
| 7,083,195 B2 | 8/2006 | Goertzen et al. | |
| 2001/0011612 A1 | 8/2001 | Takenaka et al. | |
| 2001/0011613 A1 * | 8/2001 | Schaffner et al. | 180/65.1 |
| 2003/0075365 A1 | 4/2003 | Fought | |
| 2003/0159862 A1 * | 8/2003 | Wu | 180/24.03 |
| 2004/0004342 A1 * | 1/2004 | Mulhern et al. | 280/304.1 |
| 2004/0084230 A1 * | 5/2004 | Grymko et al. | 180/65.1 |
| 2004/0094944 A1 | 5/2004 | Goertzen et al. | |
| 2004/0150204 A1 | 8/2004 | Goertzen et al. | |
| 2005/0151360 A1 | 7/2005 | Bertrand et al. | |

FOREIGN PATENT DOCUMENTS

| | | |
|---|---|---|
| FR | 2399822 | 3/1979 |
| WO | WO 82/00445 | 2/1982 |
| WO | WO 90/06097 | 6/1990 |
| WO | WO 96/15752 | 5/1996 |
| WO | WO 99/17700 | 4/1999 |
| WO | WO 00/12040 | 3/2000 |
| WO | WO 00/54718 | 9/2000 |
| WO | WO 00/66060 | 11/2000 |
| WO | WO 03/101364 | 12/2003 |

* cited by examiner

ADJUSTABLE ANTI-TIP WHEELS FOR POWER WHEELCHAIR

RELATED APPLICATIONS

The present application is a continuation of application Ser. No. 10/139,191, filed May 6, 2002, which issued as U.S. Pat. No. 6,923,278 on Aug. 2, 2005.

BACKGROUND OF THE INVENTION

The invention is directed to wheelchairs, and more particularly to front anti-tip wheels for power wheelchairs. However, various aspects of the invention may be used in other applications.

Power wheelchairs are known and have been the subject of increasing development efforts to provide disabled persons with independent mobility. Early power wheelchairs resemble conventional wheelchairs, having a drive wheel at the back of the chair. One difficulty associated with rear wheel drive wheelchairs is that they typically have very wide turning radiuses. The front or mid-wheel power wheelchair is an improvement over these early power wheelchairs. Among other advantages, front or mid-wheel power wheelchairs have tighter turning radiuses. Both front and mid-wheel drive wheelchairs will be hence forth referred to generally as mid-wheel power wheelchairs. Many improvements upon conventional mid-wheel power wheelchairs have been made. U.S. Pat. No. 5,944,131 to Schaffner et al., which is incorporated herein, discloses an improved mid-wheel power wheelchair.

One of the difficulties with mid-wheel power wheelchairs is the tendency to tip in a forward attitude during a sudden stop or while driving down an incline. In response to this problem, anti-tip wheels have been added to the front of power wheelchairs. One mid-wheel power wheelchair embodying front anti-tip wheels is disclosed in U.S. Pat. No. 5,848,658 to Pulver. The anti-tip wheels typically are attached to an arm or suspension system which suspends the anti-tip wheels some distance above the ground. The suspension of the wheels above the ground is necessary so that the wheelchair can clear small obstacles in its path of travel and turn without skidding the wheels sideways. This configuration, however, allows the wheelchair to tip slightly in a forward attitude before the anti-tip wheels engage the ground. Although the anti-tip wheels prevent the wheelchair from tipping over fully, the conventional system allows a partial tip of the wheelchair when a sudden stop occurs or while traveling down an incline. Such a partial tip is a highly uncomfortable and upsetting experience for the user. The present invention solves the problem of partial tipping of the wheelchair.

SUMMARY OF THE INVENTION

The present invention is directed to a wheelchair having one or more anti-tip wheels and a supporting structure for maintaining the anti-tip wheels in a position very near the ground when desired, thereby eliminating the uncomfortable sensation of a partial tip for the user. A lowering mechanism is provided to place the anti-tip wheels in the near ground position. The lowering mechanism may also act as a retaining system or a separate system may be provided for holding the anti-tip wheels in the near ground position. A quick release mechanism is also provided for releasing the anti-tip wheels from the near ground position when an obstacle in the path of travel is encountered.

Preferably, the anti-tip wheels are mounted on an arm extending forwardly from the frame of the wheelchair. The arm is provided with a strut connected to a spring near the middle of the arm, the spring being attached to the frame of the wheelchair at a location on the frame higher and forward of the attachment point between the frame and the rear of the arm. When an obstacle is encountered in the travel path of the wheelchair and the retaining system is disengaged, the anti-tip wheels are forced upwardly, thereby compressing the spring and allowing the wheelchair to ride over the object.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
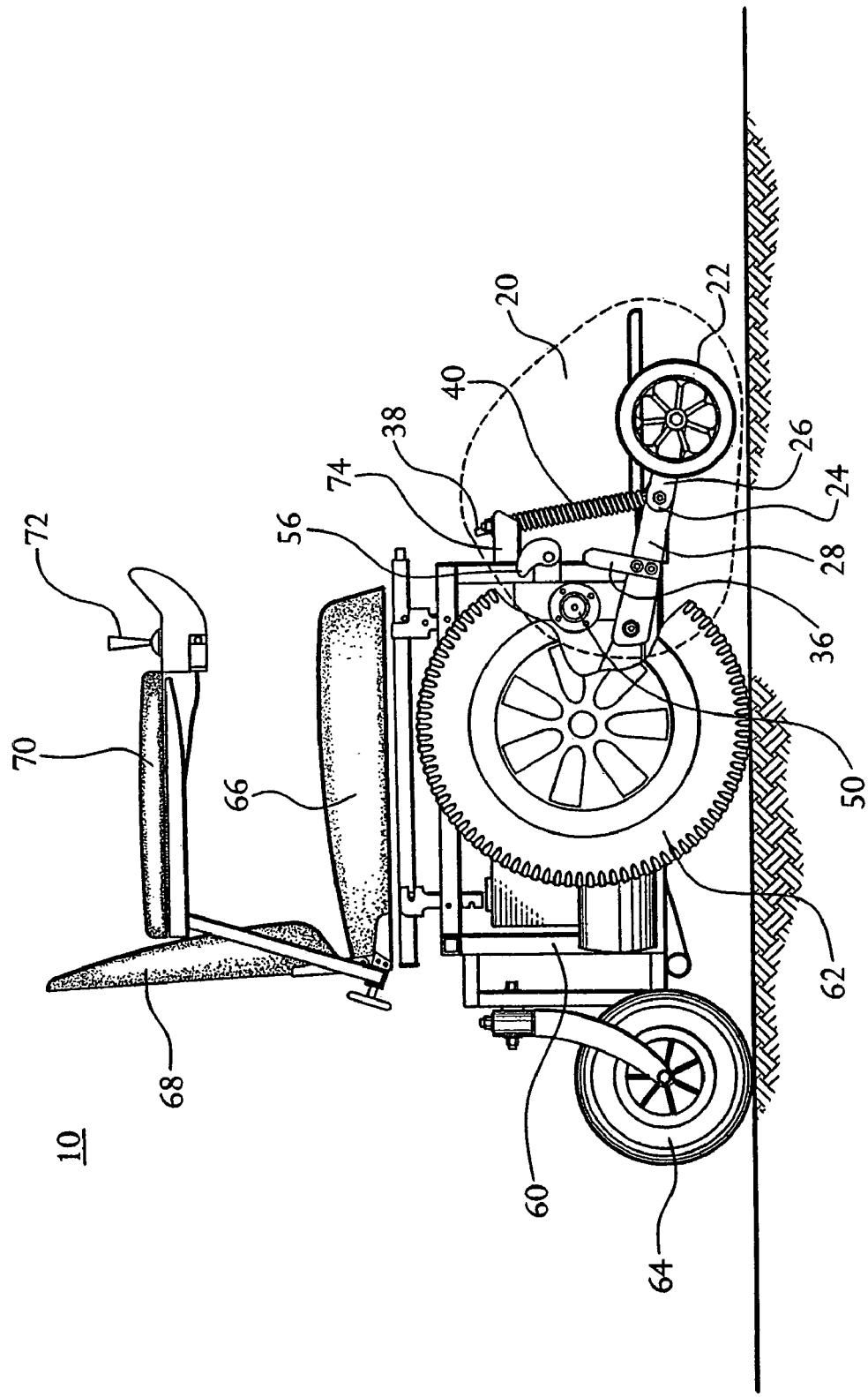
FIG. 1 is a right side view of a wheelchair according to a first embodiment of the invention with part of the drive wheel cut away.

Referring now to the drawings, wherein like numerals represent like elements, FIG. 1 shows a mid-wheel power wheelchair, according to a first embodiment of the invention, generally designated by the numeral 10. Although the invention may be practiced with only one anti-tip wheel, the invention will sometimes be described with reference to preferred embodiments, which have two anti-tip wheels. Wheelchair 10 comprises front anti-tip wheels assembly 20 connected to at least two points on frame 60. One experienced in the art will recognize that the invention could be used toward the rear of the wheelchair to prevent tipping during a sudden acceleration or travel up an incline. However, the description provided herein focuses on its use at the forward end of the wheelchair. Anti-tip wheels assembly 20 will be described in greater detail below.

Wheelchair 10 further comprises drive wheels 62 which are rotatably connected to frame 60 and driven by a single drive motor or are independently driven by dual drive motors (not shown). Suitable drive motors for use in mid-wheel power wheelchairs, as well as suitable mounting systems, differentials, and axle systems for connecting to the drive wheels, are well known to those skilled in the art. Rear wheel 64 is shown as a castor wheel connected to frame 60, it being understood, however, that the rear wheel 64 need not be a castor wheel. Rather, rear wheel 64 may take many alternative forms, including the form of anti-tip wheels assembly 20.

Wheelchair 10 further comprises a seat 66 which is preferably removably attached to frame 60. A back rest 68 may be attached to seat 66 or frame 60. An arm rest 70, having a control stick 72 is also attached to frame 60.

Referring now to FIGS. 2*a*, 2*b*, 2*c*, 3*a* and 3*b*, anti-tip wheels assembly 20, should be connected to frame 60 in at least two places, whether directly or indirectly. An arm 24 comprises front portion 26 and rear portion 28, which are rigidly connected to one another to form the forwardly extending arm 24. Rear portion 28 is pivotally connected to the frame by a bolt 32. A wheel 22 is rotatably connected to the front portion 26 by a pin 30. A cam follower 36 extends upwardly from the rear portion 28 of arm 24. Arm 24 is further connected to a dampening device comprising strut 38 and spring 40, which extend upwardly therefrom. Strut 38 and spring 40 are pivotally connected to arm 24 via a pin 34.

Figure 3A:
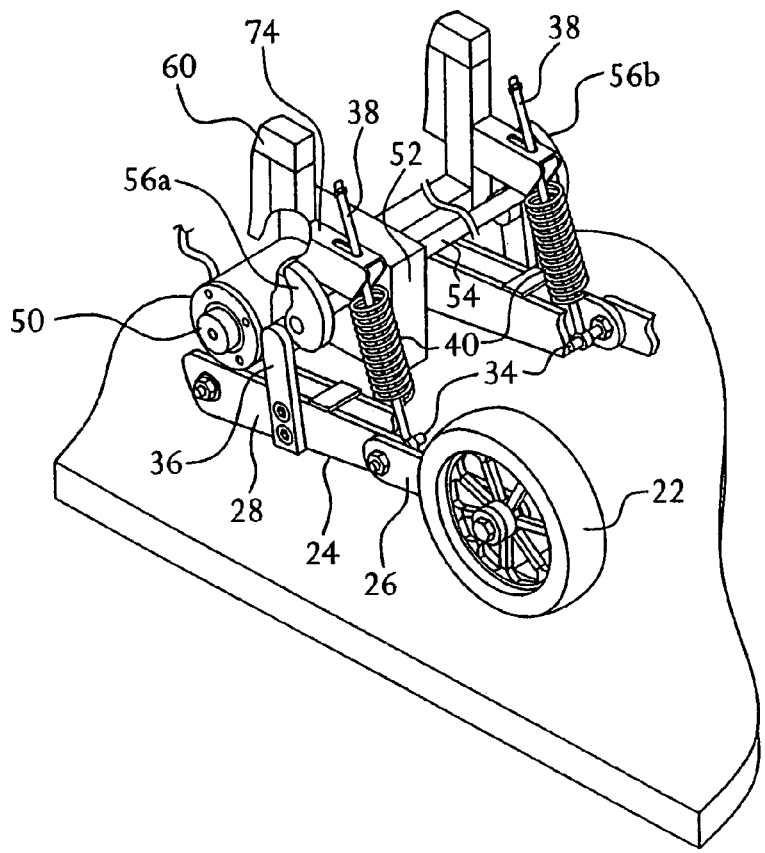
FIG. 3a is a perspective view of the motor and cam assembly of the embodiment of FIG. 2 with the anti-tip wheels in a neutral position. A portion of the frame above the motor and lower portions of the springs are cut away.
Figure 3B:
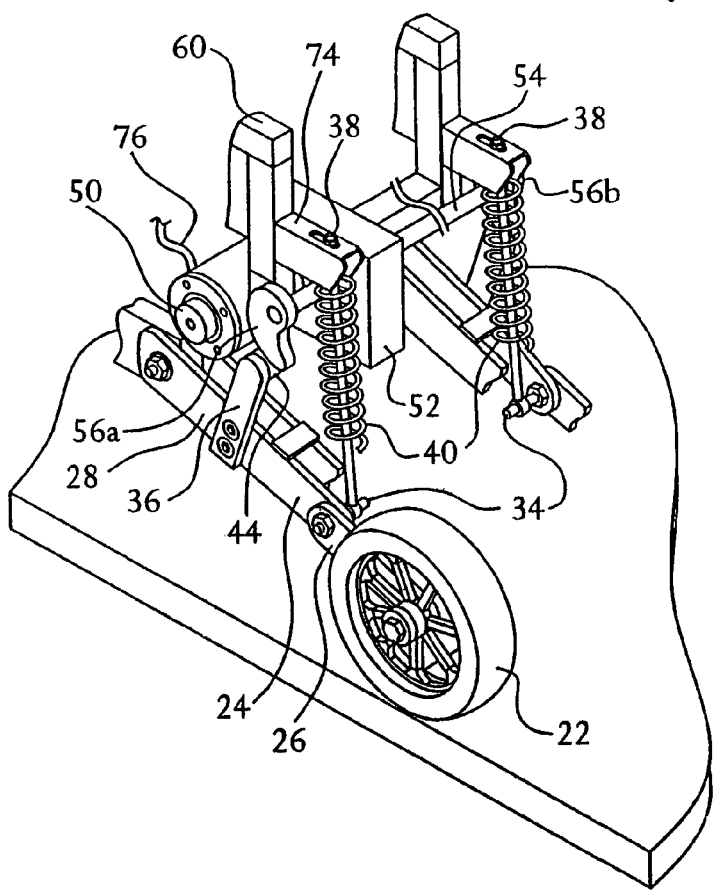
FIG. 3b is a perspective view of the motor and cam assembly of FIG. 3a with the anti-tip wheels in a near ground position. The lower portions of the springs are cut away.

The connection of strut 38 to pin 34 and arm 24 can best be seen in FIGS. 3*a* and 3*b*, which shows this embodiment having two anti-tip wheels and lowering mechanisms to engage each. Each homologous element looks and functions the same, therefore each element will be described in the singular to avoid confusion. The connection of spring 40 to pin 34 and arm 24 is not shown, the lower portion of spring 40 being cut away to reveal strut 38. It should, however, be clear that spring 40 is pivotally connected with pin 34 in a similar fashion as strut 38. Spring 40 is coiled about strut 38 and both are engaged with support member 74 at their upper ends. Support member 74 is rigidly attached to, and forms a part of frame 60, preferably at a point higher than the point at which rear portion 28 of arm 24 is attached to the frame. Spring 40 is fixedly attached to support member 74, while strut 38 is slidingly engaged with support member 74 such that the upper end of strut 38 may slide therethrough when spring 40 is compressed.

Anti-tip wheels assembly 20 further comprises a mechanism for lowering arm 24 and wheel 22. The lowering mechanism must be capable of forcing down arm 24 and wheel 22 out of a neutral position (FIG. 2A, described below) where spring 40 tends to hold them. In this embodiment, the lowering mechanism is capable of holding wheel 22 in a near ground position (FIG. 2C, described below). As used herein, near ground position is understood to include a ground engaging position wherein the wheel 22 is in contact with the ground. Such a ground engaging position is desirable if the user is traveling for a substantial distance on a smooth surface without turning or stopping. Otherwise, the near ground position is more preferably a distance off the ground which allows the wheelchair 10 to turn without wheel 22 catching awkwardly or skidding sideways, yet not so far above the ground, as to allow wheelchair 10 to tip significantly. Such a position may be only a fraction of an inch above the ground when the wheelchair 10 is used on a smooth surface, such as an indoor floor. The near ground position may be slightly higher when wheelchair 10 is to be used on rougher terrain.

In this embodiment, the lowering mechanism is capable of holding the arm 24 and wheel 22 in the near ground position, thereby acting also as a retaining mechanism. The lowering mechanism may be released from its engagement with arm 24 by rotating the anti-tip wheel motor 50 in an up direction or more quickly by disengaging the motor such as by disengaging gears within the gear box 52, which is described immediately below. Releasing the lowering mechanism allows the spring 40 to tend to return arm 24 and wheel 22 to the neutral position.

Figure 2A:
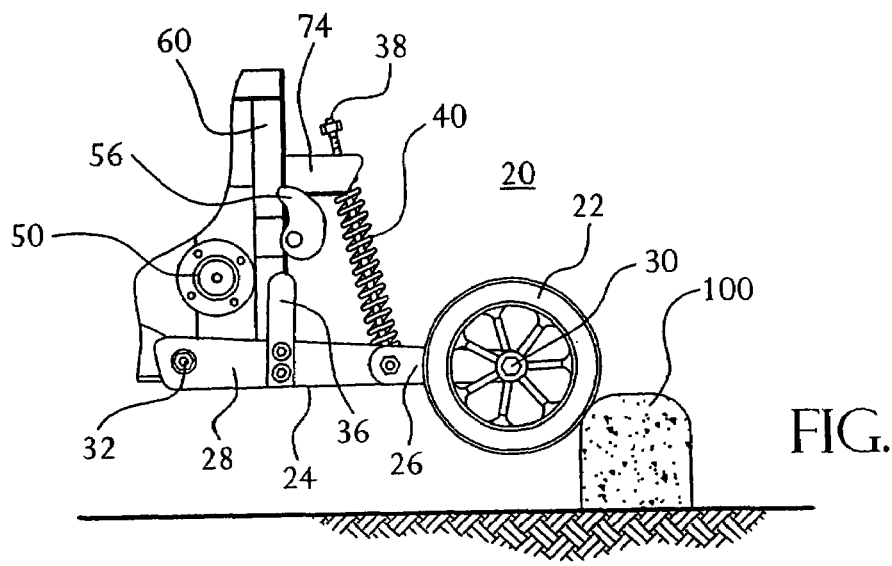
FIG. 2a is a side view of an anti-tip wheels assembly according to the first embodiment with anti-tip wheels in a neutral position.
Figure 2B:
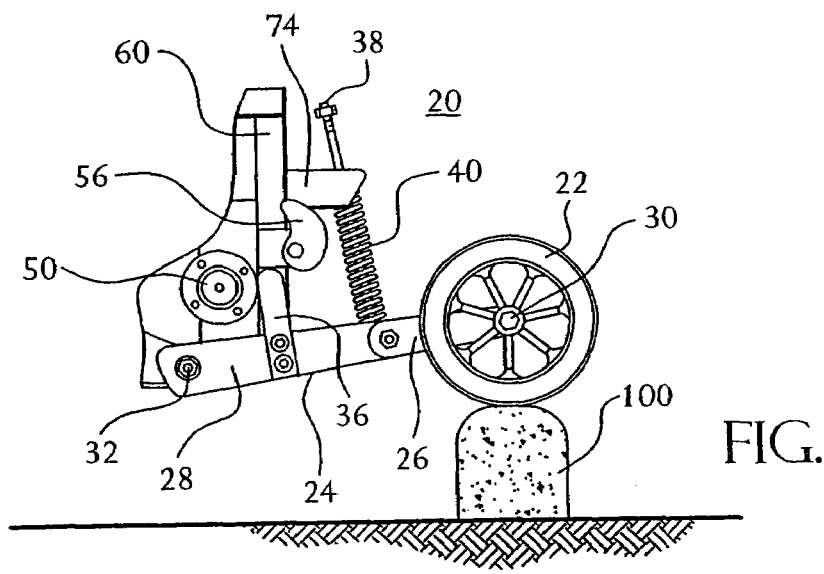
FIG. 2b is a view of the assembly shown in FIG. 2a with anti-tip wheels pushed upwardly by contact with an obstacle.
Figure 2C:
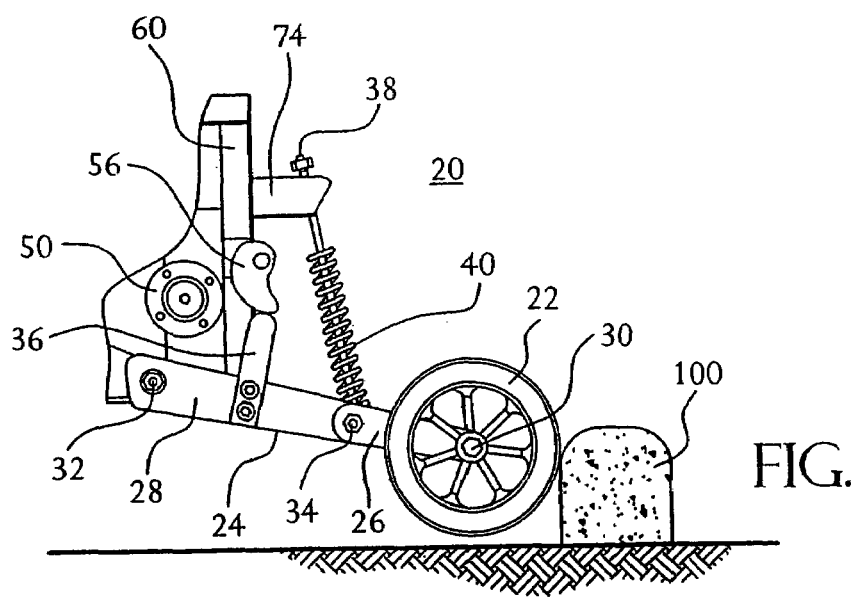
FIG. 2c is a view of the assembly shown in FIG. 2a with its anti-tip wheels engaged in a near ground position.

The lowering mechanism of the first embodiment can best be understood by examining FIGS. 3*a* and 3*b* together with FIGS. 2*a*, 2*b*, and 2*c*. The lowering mechanism comprises an anti-tip wheel motor 50 preferably mounted to the frame 60. As seen in FIG. 3*a*, where part of the frame 60 is cut away, the anti-tip wheel motor 50 is connected to a gear box 52 and provides power thereto when activated by the user. Cam shaft 54 is rotatably connected to gear box 52 and receives rotational power therefrom. Two cams 56*a* and 56*b* are provided as seen in FIGS. 3*a* and 3*b*. In this embodiment, cam shaft 54 preferably serves as a connecting rod between the cams 56*a* and 56*b*. Otherwise, two motors may power two cam shafts which independently rotate two cams. The cams 56*a* and 56*b* are rigidly mounted to both ends of cam shaft 54. In this form of the invention, the cams 56*a* and 56*b* are in rotational unison. As shown in FIGS. 2*a*, 2*b*, and 2*c*, in which cam 56*a* is identified simply by the number 56 and represents the function of both cams, cams 56 must be mounted such that they engage followers 36 when rotating downwardly. Cam shaft 54 may be removably mounted to the frame 60. The removable mounting is desirable if the wheelchair battery (not shown) is front removable.

Referring specifically to FIG. 2*a*, cam 56 is shown in its up position. The cam 56 is therefore exerting no force on follower 36. Thus, arm 24 is free of any influence from the lowering mechanism. The forces acting on the arm 24 in this state are the downward gravitational force and the force of the spring 40 tending to assume its relaxed state, holding the arm 24 and wheel 22 in the neutral position. Arm 24 and wheel 22 are free to move up or down, as far as spring 40 will tolerate under any particular external force. In this state, anti-tip wheels 22 will rise when they encounter an upward force, such as when the wheelchair 10 encounters a curb. Also in this state, strut 38 extends partially through the top of support member 74.

It should be clear to those of ordinary skill in the art, that the position of the anti-tip wheels 22, in terms of their height off the ground, while free of influence from the lowering mechanism or external forces, is dependent on the size and tension of the spring 40. The size and tension of the spring 40 may therefore be preselected and may depend upon the size of the user as well as the user's preferences concerning the height of the wheels 22 off the ground.

FIG. 2*b* shows the state of the anti-tip wheels assembly 20 when the cams 56 are in an upward position and an upward force is applied to the wheels 22. As in FIG. 2*a*, the lowering mechanism exerts no force on arm 24. An upward force may be generated when wheel 22 encounters an obstacle, such as a curb 100. Spring 40 resists the upward force; but where the force is great enough, spring 40 becomes compressed, allowing arm 24 and wheel 22 to rise. Strut 38 is free to slide upward through support member 74. While raised, wheel 22 is able to clear obstacle 100.

FIG. 2c shows the anti-tip wheels assembly 20 with the lowering mechanism engaged. Cam 56 is in its downward position engaging follower 36. Spring 40 is stretched beyond its relaxed state. The spring resists this state, tending to return to the neutral position shown in FIG. 2a. However, the force exerted on arm 24 via cam 56 and follower 36 is great enough to overcome the resistance of the spring 40. As long as cam 56 remains in the downward position, arm 24 is forced to remain down despite the tendency of spring 40, thereby holding wheel 22 in a position very near to the ground (the near ground position). Thus, the cam 56 acts as both the lowering mechanism and the retaining system, thereby providing a unified anti-tip wheel positioning assembly.

As shown in FIG. 3b, followers 36 each preferably include a roller 44 rotatably connected to the upwardly extending portion of follower 36 for engaging cam 56. Where the rollers 44 are not employed, cams 56 may engage followers 36 directly. The use of rollers 44 allows the transmission of power from the cams 56 to the followers 36 to occur smoothly. Further, the rollers 44 will sustain less wear than a flat or knife type follower, thereby requiring less maintenance and preventing replacement after extended use.

As discussed above, and shown in FIGS. 3a and 3b, the power for the lowering mechanism is provided by anti-tip wheel motor 50 which should be connected to a power source (not shown) through wires 76. Many types of motors are suitable for providing the power for the lowering mechanism. The preferable motor speed is from about 8 to about 30 revolutions per minute.

Control circuits are preferably provided to control the motion of the anti-tip wheel motor 50 and prevent backdrive thereof. Preferably, the control circuits include an up control circuit for operating the anti-tip wheel motor in an up direction and a down control circuit for operating the anti-tip wheel motor in a down direction. In addition, a safety interlock control circuit operates to prevent any drive voltage from operating the anti-tip wheel motor under predetermined conditions, such as when neither the up nor down control circuits are operating or when a user inadvertently operates both the up and down circuits simultaneously. Further, up and down limit control circuits stop the anti-tip wheel motor at respective predetermined limits of upward and downward movement of the anti-tip wheels.

The up and down control circuits each include manual control elements, such as user-actuated switches, in electrical communication with a voltage source. The manual control elements may be distinct up and down direction switches, or elements of a three-position (or more) switch, which serves both capacities. For purposes of clarity, only an embodiment of the circuit with separate up and down switches will be described in detail. Each up and down circuit also includes a time delay circuit element, and a switching circuit to energize the anti-tip wheel motor respectively in the up or down direction.

The safety interlock control circuit includes a logic gate having an input connected to each of the up and down switches, and a switching circuit to create a short circuit across the anti-tip wheel motor.

The up and down limit control circuits each include an automatic control element that is actuated at the respective predetermined limits of upward movement of the anti-tip wheels, and a disabling circuit that disables the respective switching circuits of the up and down control circuits.

A first relay is in electrical communication with the up control switch across a capacitor and through one or more components causing a propagation delay, i.e., a time delay element. In use, the first relay supplies a voltage to a first side of the motor 50 when the motor control switch is closed. Further, a transistor is in electrical communication with the up switch through a logical inverter. The transistor is connected to the capacitor and discharges the capacitor when the motor control switch is open.

When neither the up nor down switches are closed, first logical signals are provided to the logic gate, which produces a first output. The output of the logic gate is connected to a second relay, which closes an electrical connection across the anti-tip wheel motor 50 when the logic gate provides the first output. When either of the manual control elements is closed, a second logical input is provided to the logic gate, driving the logic gate to produce a second logical output. The second relay opens the electrical connection across the motor 50 when the logic gate provides a second output.

The down switch is connected to and acts on a third relay in an analogous manner as the up switch and first relay. The third relay is in electrical communication with the down direction switch across a second capacitor and through a second component having a propagation delay. The third relay supplies a voltage to a second side of the anti-tip wheel motor when the down direction switch is actuated. A second transistor is in electrical communication with the down direction switch through a second logical inverter. The second transistor is connected to the second capacitor and discharges the second capacitor when the down direction switch is open.

The up and down limit circuits, stop the motor when the anti-tip wheels move to the respective predetermined heights. Each limit switch is automatically actuated (opens) when the anti-tip wheels reach the predetermined height. The limit switches each connect a first height limit transistor to a first height limit voltage source when closed. When each limit switch is closed, the first height limit transistor draws voltage from a second height limit voltage source. When the height limit switch is open, the second height limit voltage source biases a second height limit transistor, which then draws voltage from the input of the logic gate and the first or third relays, respectively, turning off the motor 50.

Figure 7:
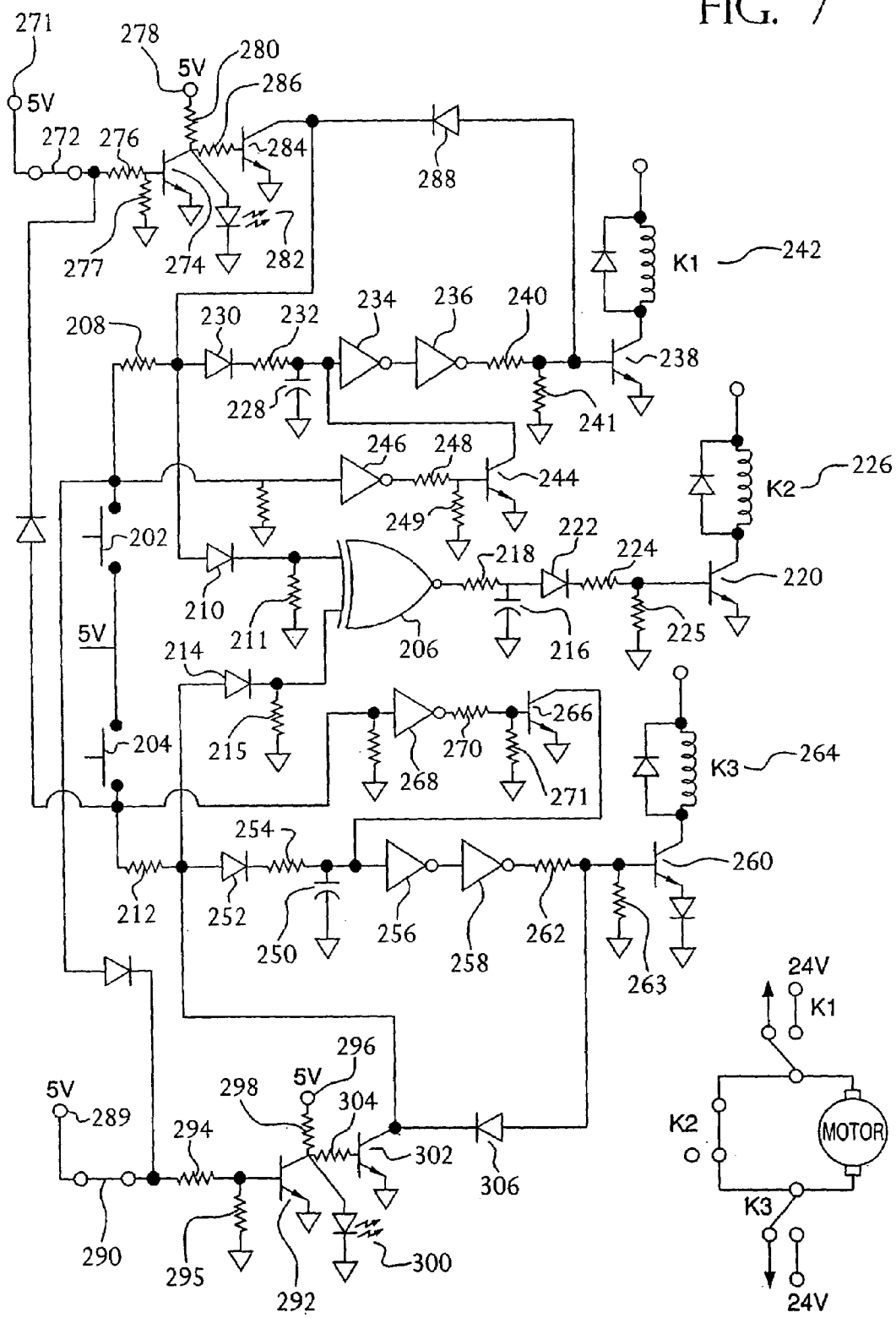
FIG. 7 is a schematic diagram of a control circuit for controlling an anti-tip wheel motor.

A preferred embodiment of the control circuit will now be described in greater detail. Up and down switches 202, 204, which are shown schematically in FIG. 7, are connected to a 5 volt power source. The control circuit is shown with both the up and down switches 202, 204 open, which is their default position while the motor 50 is in a standby state. The up switch 202 provides a first input to an exclusive NOR gate 206 via a 1 K (Kilohm) resistor 208 and diode 210. The first input is grounded through a 51 K resistor 211. The down switch provides a second input to the exclusive NOR gate 206 via a 1 K resistor 212 and a diode 214. Similar to the first input, the second input to the exclusive NOR gate 206 is grounded through a 51 K resistor 215. While both switches are open, both inputs to the exclusive NOR gate 206 are low, producing a high output from exclusive NOR gate 206, which charges a 10 microfarad capacitor 216 through a 10 K resistor 218. With the capacitor 216 charged, a bipolar transistor 220 becomes biased through a diode 222 and 1 K resistor 224. The connection between resistor 224 and transistor 220 is grounded through a 51 K resistor 225. The biasing of transistor 220 causes a relay K2 (element 226) to toggle, which creates a short across the motor 50.

When the up switch 202 is pressed, a logical high is provided to the first input at the exclusive NOR gate 206 via resistor 208 and diode 210. The output of the exclusive NOR gate becomes low, causing capacitor 216 to discharge, transistor 220 to unbias, and relay K2 to toggle, thereby opening the short across motor 50. In addition, a 47 microfarad capacitor 228 is charged through a diode 230 and 33 K resistor 232. A logical high is thereby produced at the output of a pair of inverters 234 and 236, which biases a transistor 238 through a 1 K resistor 240. The connection between transistor 238 and resistor 240 is grounded via a 51 K resistor 241. Biasing the transistor 238 toggles a second relay K1 (element 242), which causes 24 volts to be supplied to the motor 50, driving the motor to turn in the upward direction. Charging the capacitor 228 through the 33 K resistor 232 creates a short time delay and the inverters 234, 236 create a small propagation delay in toggling the relay K1. It is thereby ensured that the short across the motor has been opened by relay K2 before power is supplied to the motor 50 by relay K1.

Also while the up switch 202 is closed, a logical low is provided to transistor 244 through an inverter 246 and 1 K resistor 248. The connection between the transistor 244 and resistor 248 is grounded via a 51 K resistor 249. With the logical low input, the transistor 244 is unbiased and does not conduct. When the up switch 202 is opened, the inverter 246 provides a logical high to bias transistor 244, which discharges capacitor 228. The relay K1 is thereby toggled open, quickly stopping the motor 50.

When the down switch 204 is closed, a logical high is provided to the second input at the exclusive NOR gate 206 via resistor 212 and diode 214. The output of the exclusive NOR gate becomes low, causing capacitor 216 to discharge, transistor 220 to unbias, and relay K2 to toggle, thereby opening the short circuit across the motor 50. In addition, a 47 microfarad capacitor 250 is charged through a diode 252 and 33 K resistor 254. A logical high is thereby produced at the output of a pair of inverters 256 and 258, which biases transistor 260 through a 1 K resistor 262. The connection between transistor 260 and resistor 262 is grounded via a 51 K resistor 263. Biasing the transistor 260 toggles a third relay K3 (element 264), which causes 24 volts to be supplied to the motor 50, driving the motor to turn in the downward direction. Charging the capacitor 250 through the 33 K resistor 254 creates a short time delay and the inverters 256, 258 create a small propagation delay in toggling the relay K3, thus ensuring that the short across the motor has been opened by relay K2 before power is supplied to the motor 50.

Also while the down switch 204 is closed, a logical low is provided to transistor 266 via an inverter 268 and 1 K resistor 270. The connection between the transistor 266 and resistor 270 is grounded via a 51 K resistor 271. With the logical low input, the transistor 266 is unbiased and does not conduct. When the down switch 204 is released, the inverter 268 provides a logical high to bias transistor 266, which discharges capacitor 250. The relay K3 is thereby toggled off, quickly stopping downward motion of the motor 50.

Up and down limit switches are also provided to stop motion of the motor when the anti-tip wheels reach a pre-selected up or down position. The up-limit switch 272, which is connected to a 5 volt source 271, is normally closed and connected to a transistor 274 through a 1 K resistor 276. The connection between the transistor 274 and resistor 276 is grounded via a resistor 277. While the up-limit switch 272 is closed, transistor 274 is "on", draining another 5 volt source 278 connected thereto through a 1 K resistor 280. That keeps a second transistor 284 unbiased and "off". The up-limit switch 272 opens when the anti-tip wheels travel to their highest allowed point off the ground. The up-limit switch 272 can be opened mechanically by the wheel arm 24, or via a relay connected to a remote sensing device (not shown). When the up-limit switch 272 is open, the connection to the voltage source 271 is removed and the transistor 274 is biased "off", which causes a light emitting diode 282 to illuminate, thereby indicating that the anti-tip wheels have reached the full up position. The biasing of transistor 274 "off" results in the source 278 biasing the second transistor 284 "on" via a 10 K resistor 286. When the transistor 284 is thereby biased "on", both the high at the first input to the exclusive NOR gate 206 and the high output from the inverters 234 and 236 (via diode 288) are drawn off by the transistor 284. The up switch 202 is thereby disabled by opening relay K1 (element 242) and closing relay K2 (element 226), thus turning off the motor 50.

The down-limit switch 290 works in a similar manner as the up-limit switch 272. The down-limit switch 290 is connected to a 5 volt source 289 and is normally closed, connecting the source 289 to a transistor 292 via a 1 K resistor 294. The connection between the transistor 292 and resistor 294 is grounded via a resistor 295. While the down-limit switch 290 is closed, transistor 292 is biased "on", draining another 5 volt source 296 connected thereto through a 1 K resistor 298, and keeping a second transistor 302 unbiased and "off". The down-limit switch 290 is opened when the anti-tip wheels travel to their lowest allowed point near the ground. The down-limit switch 290 can be opened mechanically by the wheel arm 24, or via a relay connected to a remote sensing device (not shown). When the down-limit switch 290 is open, the connection to the voltage source 289 is removed and the transistor 292 is biased "off", which causes a light emitting diode 300 to illuminate, thereby indicating that the anti-tip wheels have reached the full down position. The biasing of transistor 292 "off" results in the voltage source 296 biasing the transistor 302 "on" via a 10 K resistor 304. When the transistor 284 is biased "on", both the high at the second input to the exclusive NOR gate 206 and the high output from the inverters 256, 258 (via diode 306) are drawn off by the transistor 302, thereby disabling the down switch 204 by opening the relay K3 (element 264), closing the relay K1, and thus turning off the motor 50.

The up and down switches 202, 204 should be easily accessible by the user. One place where the motor 50 control switches may be mounted is on the arm 70 near control stick 72. The motor 50 may also be connected to a secondary control unit which cooperates with a proximity or impact sensor. When so connected, the impact or proximity sensor automatically activates the up circuit when an obstacle in the path of travel is detected, driving the motor 50 in the upward direction to disengage the retaining mechanism (by rotating the cams 56, as discussed below), and allowing the anti-tip wheels to rise out of the near ground position so that the wheelchair can clear the obstacle.

The operation of the lowering mechanism of the first embodiment is best shown in FIGS. 3a and 3b. When the cams 56 are in the up position, anti-tip wheels 22 and arm 24 are in a neutral position, being tended there by the spring 40. As a user supplies power to the motor 50, motor 50 provides rotational motion to gearbox 52. Gearbox 52 transfers input power to rotational power in the cam shaft 54. As cam shaft 54 rotates, cams 56 are rotated into their downward position, engaging followers 36. Followers 36 and arm 24 are forced downwardly against the tendency of spring 40. Wheels 22 are lowered along with arm 24. When wheels 22 reach the desired position near the ground, the motor 50 stops providing power to the system. Cams 56 are thereby held in a downward position, engaging the wheels into the near ground position. When a user wishes to release the wheels 22 from the near ground position or when an attached proximity or impact sensor provides an appropriate signal, the motor 50 is supplied with power again. The motor provides power to the gearbox 52 which rotates the cam shaft 54. The cams 56 are thereby rotated back into their upward position. With cams 56 disengaged from followers 36, spring 40 tends back to its relaxed state, pulling arm 24 and wheels 22 up into the neutral position.

Figure 4A:
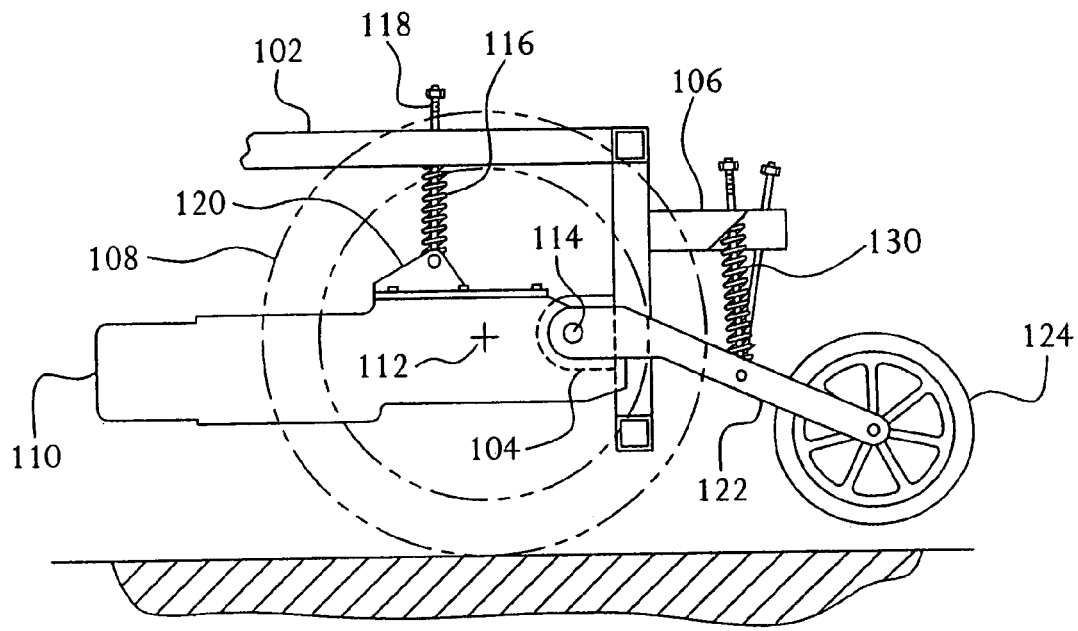
FIG. 4a is a broken schematic side view of a second embodiment of the invention with anti-tip wheels in a neutral position.
Figure 4B:
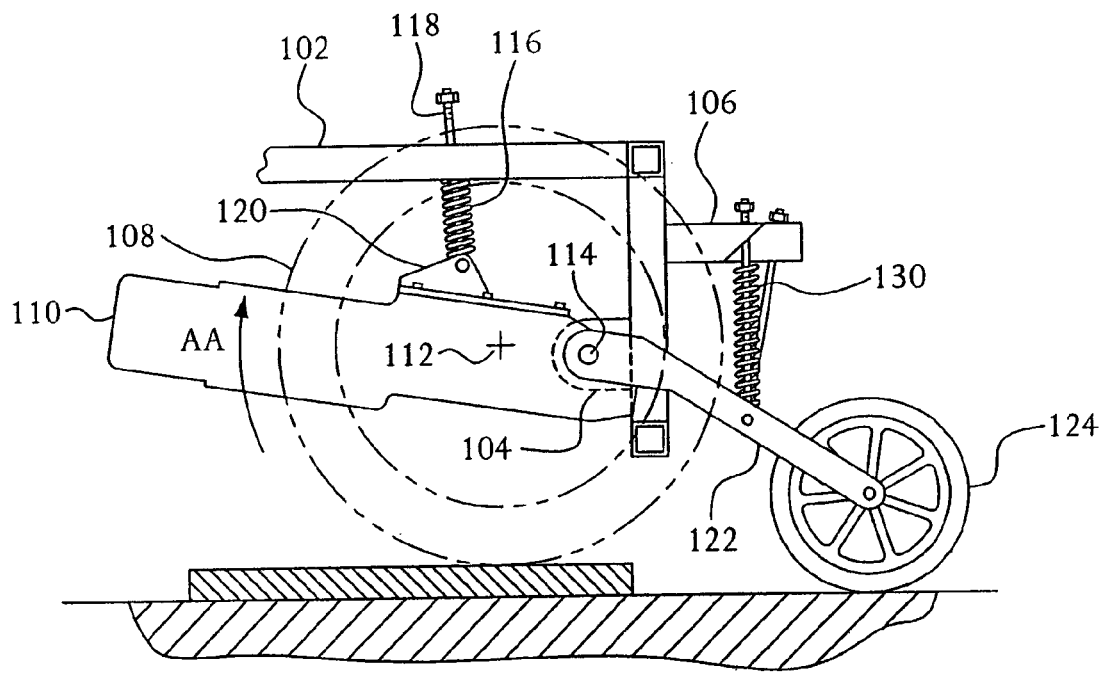
FIG. 4b is a broken schematic side view of the second embodiment of the invention with anti-tip wheels in a near ground position.
Figure 4C:
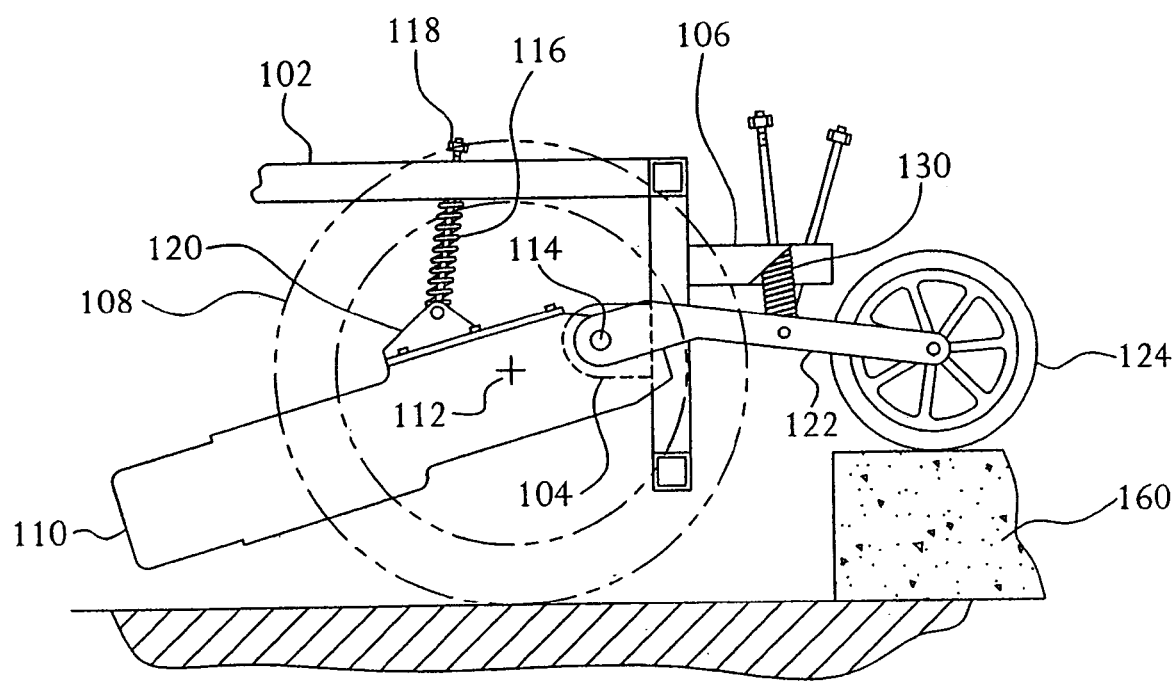
FIG. 4c is a broken schematic side view of the second embodiment of the invention with anti-tip wheels in a near ground position.
Figure 5:
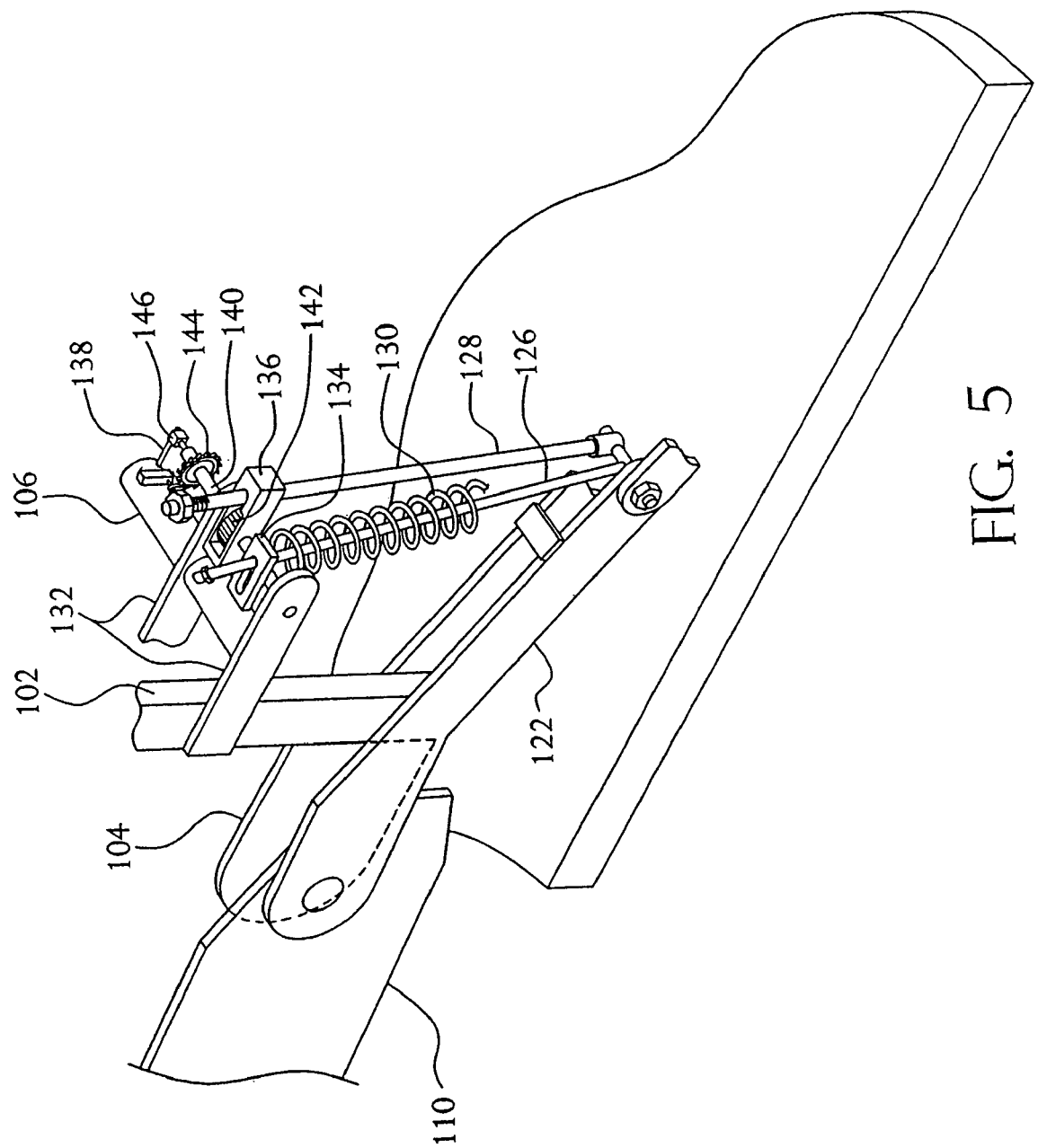
FIG. 5 is a perspective view of a retaining system according to the embodiment shown in FIG. 4.
Figure 6:
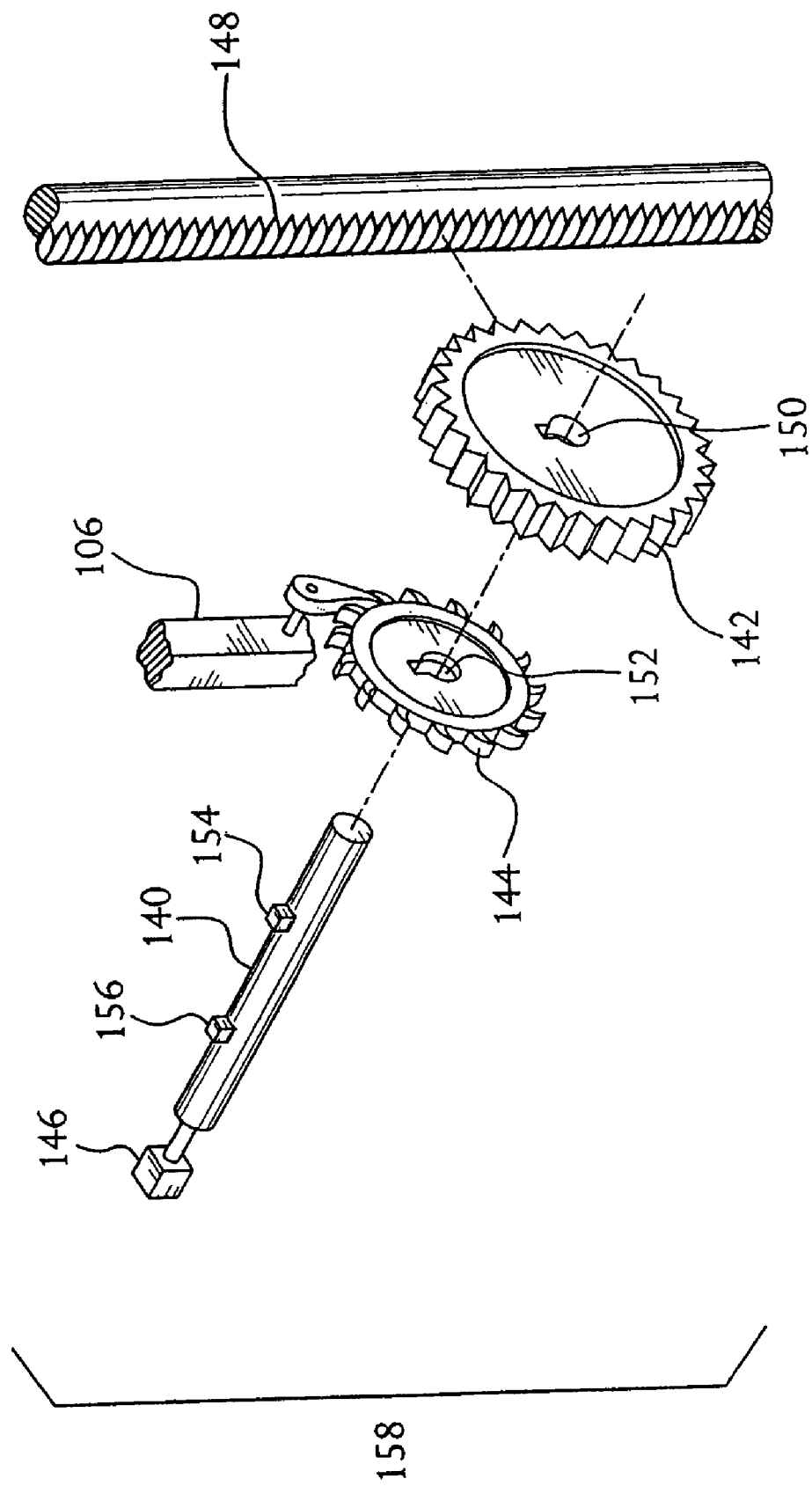
FIG. 6 is an exploded view of a ratchet, gear and gear shaft assembly of the embodiment of FIG. 5.

A second embodiment of the invention, shown in FIGS. 4 through 6, may be used in cooperation with a wheelchair suspension system, and is currently preferred. An exemplary suspension system is disclosed by U.S. Pat. No. 6,129,165 to Schaffner, et al, incorporated herein by reference.

The wheelchair of this embodiment, shown in FIGS. 4a through 4c and described more fully in the '165 patent, includes a frame 102 having eye members 104 and a supporting assembly 106 rigidly attached thereto. Each of a pair of drive wheels 108 is rotatably associated with an independent suspension member 110 at its center of rotation 112. The suspension member 110 is pivotally attached to the frame 102 via eye member 104 at a pivot connection 114. A coil spring 116 is wrapped around a shaft 118 and at one end preferably abuts web 120. Alternatively, the lower end of spring 116 may be fixedly connected to shaft 118 or to a sleeve fitted about an unnumbered shaft which extends transversely between web 120 and a web which is hidden from view in FIGS. 4a through 4c.

An anti-tip wheel arm 122 is fixedly attached to suspension member 110. The arm 122 preferably includes a pivotal adjustment mechanism (not shown) for adjusting the height of an anti-tip wheel 124. Such a mechanism is described in U.S. patent application Ser. No. 09/765,022, filed Jan. 18, 2001 and incorporated herein by reference.

FIG. 5 shows the arm 122 associated with supporting assembly 106 by strut 126 and locking rod 128. A spring 130 is coiled about strut 126. The supporting assembly 106 is fixedly attached to the frame 102, and includes one or more support arms 132 extending from the frame 102, a strut bracket 134, a locking rod bracket 136, and a solenoid bracket 138.

The locking rod 128 is slidingly engaged with the locking rod bracket 136 through an aperture therein. The locking rod bracket 136 rotatably supports a gear shaft 140 and a gear 142, which may be freely engaged or disengaged with gear shaft 140 as described below.

A ratchet 144 is similarly associated with gear shaft 140 such that it too can be engaged or disengaged therefrom. The ratchet 144 is engaged with solenoid bracket 138 (or elsewhere on the supporting assembly 106) such that gear shaft 140 is limited to one direction of rotational movement when ratchet 144 is engaged therewith.

A solenoid 146 is attached to solenoid bracket 138 and is rotatably connected to gear shaft 140. Actuation of the solenoid 146 causes the gear shaft to slide back and forth within its engagements with the supporting assembly, slidable engagement points being provided in the arms 132 and locking rod bracket 136.

Shown in FIG. 6, the gear 142 engages teeth 148 provided on locking rod 128. The gear 142 and ratchet 144 are each provided with an aperture 150, 152 which has a non-round shape. The shape of apertures 150, 152 may be square, or any number of other shapes which would not allow rotational slippage. The shape of apertures 150, 152 may be a circle with a notch protruding therefrom, as shown in the Figures. The gear shaft 140 is provided with regions having a shape corresponding to the shape of apertures 150, 152. In the embodiment shown in FIG. 6, gear shaft 140 is provided with tabs 154, 156. Tabs 154, 156 may be associated with the notch in each of apertures 150, 152 such that gear 142 and ratchet 144 rotate in unison with gear shaft 140. However, actuation of the solenoid 146 causes gear shaft 140 to slide out of engagement with the gear 142 and ratchet 144, allowing gear 142 to rotate independently of gear shaft 140. Alternatively, the gear 142, ratchet 144 and gear shaft 140 system may be constructed such that the gear shaft 140 remains engaged with either gear 142 or ratchet 144 notwithstanding solenoid actuation, but not both. Accordingly, the design shown in FIG. 6 may be modified by extending the length of either tab 154 or 156 so that gear 142 or ratchet 144 remains in rotational unison with gear shaft 140 at all times. Any of these alternatives provides an acceptable retaining system 158.

It is, of course, understood that other means, such as a system employing bearings, can be used in the second embodiment in place of the ratchet system described herein. However constructed, the retaining system must allow lowering of the anti-tip wheels and must hold the anti-tip wheels in the near ground position until released.

While the retaining system 158 is engaged, (i.e. when both the gear 142 and ratchet 144 are in rotational unison with gear shaft 140 and the gear 142 is engaged with the teeth 148 of locking rod 128), a lowering movement of arm 124 pulls downwardly on strut 126 and locking rod 128, causing rotation of gear 142 and gear shaft 140. The downward movement of locking rod 128 causes gear shaft 140 rotation in the direction permitted by ratchet 144. When the arm 122 is subjected to an upward force, which is in turn transferred through locking rod 128 and gear 142 to gear shaft 140, the upward force tends to rotate the gear shaft 140 in the opposite direction in which it was rotated during the downward movement of arm 124. However, the ratchet 144 prevents rotation in that direction, thereby locking down the arm 124.

The wheelchair of this embodiment is equipped with one or more release trigger devices (not shown) for actuation of the solenoid 146 which releases the retaining system 158. The release trigger may be a switch (not shown) mounted on the wheelchair armrest and connected to a power supply. Preferably, the release trigger comprises a proximity sensor or an impact detector (neither shown) for sensing an obstacle in the path of travel. A proximity sensor, such as the type described in U.S. Pat. No. 5,701,122 to Canedy, incorporated herein by reference, may use one or more optical sensors to detect objects within a predetermined distance in front of the anti-tip wheels. A mechanical impact detector, such as the type described in U.S. Pat. No. 5,485,140 to Bussin, also incorporated herein by reference, may be positioned on the anti-tip wheel assembly such that an impact probe attached to a flexible rod extends forward thereof. The proximity sensor or impact detector can provide a signal for actuating the solenoid 146, thereby releasing the retaining system 158.

Returning now to FIGS. 4a through 4c, the function of the second embodiment of the invention will be described. Whether the retaining system is engaged or disengaged, the anti-tip wheels 124 tend to maintain a neutral position above the ground when free of influence from the lowering mechanism and free of external upward or downward forces, as shown in FIG. 4a.

The lowering mechanism in this embodiment involves the suspension system. The anti-tip wheels 124 are forced downwardly in response to a deceleration force, such as when the wheelchair is brought to a stop on a smooth surface, when negotiating an incline, or when a drop edge is encountered in the path of travel. FIG. 4*b* shows a power wheelchair approaching a drop edge. As is more fully described in the '165 patent, the occupant of power wheelchair reduces output torque of the drive motors (not shown) creating a load on drive wheels 108 from the associated drive motors. This tends to decelerate the drive wheels respecting rotation in the direction indicated by arrow AA in FIG. 4*b*. This deceleration of drive wheels 108 causes suspension member 110 to rotate about pivot point 112 in the direction of arrow AA in FIG. 4*b*, causing anti-tip wheels 124 to move downwardly. The rotation of suspension member 110 compresses spring 116. Once the deceleration effect has ceased, spring 116 tends to raise the anti-tip wheels 124 back into the neutral position. However, with the retaining system 158 engaged, locking rod 128 prevents the wheels from rising. Thus, the anti-tip wheels 124 are locked in the near ground position, preventing any substantial tipping of the wheelchair.

The operator may release the wheels by controlling the solenoid 146 if desired. Otherwise, the anti-tip wheels 124 may be left in the near ground position until the wheelchair encounters an obstacle in its travel path. Preferably, when the obstacle is encountered, the release trigger device detects the object and sends a signal to automatically actuate the solenoid. As noted above, actuation of the solenoid disengages the retaining system and allows the force exerted by spring 116 to rotate the suspension member 110 back into the neutral position, thereby raising anti-tip wheels 124 to the neutral position.

While the retaining system is disengaged, the anti-tip wheels 124 may be forced upwardly by an upward force supplied by the encountered obstacle 160, as shown in FIG. 4*c*. When this occurs, spring 130 absorbs the shock of the impact, and allows the anti-tip wheels 124 to rise smoothly until adequate clearance for climbing over the obstacle is achieved.

A number of variations of this embodiment should be apparent to one skilled in the art from the description provided herein. Rather than a system involving ratchet 144 or bearings (discussed above), the retaining system 158 may comprise a locking mechanism (not shown) provided to secure gear 142 and gear shaft 140. The locking mechanism may be any known device which would prevent the gear 142 and gear shaft 140 from turning. Such devices could include a pivotally attached tab or hook on the frame, or a cord, wire or the like. Other devices such as brakes and clamps should also be apparent to those skilled in the art. The user may engage the locking mechanism to prevent the gear 142 from spinning under the tendency of spring 116 while the anti-tip wheels are in the near ground position, thereby holding the arm 122 and wheels 124 in the near ground position. Alternatively, the locking mechanism may act on the locking rod 128 directly. Such a locking mechanism is preferably controlled by sensors providing signals indicative of the anti-tip wheels height off the ground. The locking mechanism may be quickly disengaged electronically via a signal from an operator switch or automatically from a release trigger system such as one described above.

Further variations are within the scope of the invention, some of which may be achieved by combining elements of the two representative embodiments shown in the Figures. For example, a wheelchair may include an anti-tip wheel arm fixed to an independent suspension member and responsive to changes in rotational velocity of the associated drive wheel as described with regard to FIGS. 4A through 4C, and a motor driven cam system as shown in FIGS. 3A through 3C. Such a wheelchair may also include the anti-tip wheel control circuit described with reference to FIG. 7.

It is to be understood that other similar embodiments may be used, or modifications and additions may be made to the described embodiments for performing the same function of the present invention without deviating therefrom. Therefore, the present invention is not limited to the two embodiments shown, but rather should be construed in breadth and scope in accordance with the recitation of the appended claims.

What is claimed is:

1. A power wheelchair comprising:
   a frame;
   a seat mounted on the frame;
   a motor for controlling and driving at least one of a pair of drive wheels;
   an anti-tip wheel assembly pivotally attached to the frame and supporting one or more anti-tip wheels, the anti-tip wheel assembly resiliently positioning the one or more anti-tip wheels in a predetermined neutral position relative to the ground on which the drive wheels normally ride; and
   a retaining system holding the one or more anti-tip wheels in a fixed position relative to the ground, the retaining system having intermeshing teeth that selectively engage and release.

2. A vehicle comprising:
   a frame;
   a pair of drive wheels operatively positioned on opposite sides of the frame;
   a seat mounted on the frame;
   a drive motor for driving at least one of a pair of drive wheels;
   an anti-tip wheel mounted to a suspension member, the suspension member pivotally supported on the frame and having a resilient suspension; and
   a retaining system for selectively holding the anti-tip wheel in a fixed position relative to the frame in response to one or more operational conditions of the vehicle during driving of the drive wheels by the motor.

3. The vehicle of claim 2 further comprising a release trigger device adapted to disengage the retaining system.

4. The vehicle of claim 3 wherein the release trigger device automatically sends a signal for releasing the retaining system in response to detection of an obstacle in the path of travel of the wheelchair.

5. The vehicle of claim 2 wherein said suspension system is operatively coupled to the motor and is pivotally responsive to the torque generated by the motor and applied to the corresponding drive wheel.

6. The vehicle of claim 2 wherein the suspension member comprises an arm pivotably mounted on the frame and the anti-tip wheel positioned at a projected end of the arm.

7. The vehicle of claim 2 wherein the retaining system comprises a first element and a second element, the second element operably connected to the suspension member, the first and second elements operably positioned to engage one another to fix the position of the anti-tip wheel.

8. The vehicle of claim 7 wherein the suspension member comprises an arm pivotably mounted at one end to the frame and the anti-tip wheel positioned at an opposite end thereof.

9. The vehicle of claim 8 wherein the second member is operatively connected to the arm.

10. The vehicle of claim 7 wherein the first member is operative connected to the frame.

11. The vehicle of claim 2 wherein the retaining system comprises a first ratchet operatively coupled to the anti-tip wheel and at least one tooth for selectively engaging the ratchet arm for fixing the position of the anti-tip wheel through the operative coupling.

12. The vehicle of claim 2 wherein the retaining system comprises a plurality of intermeshing teeth that selectively engage one another for holding the anti-tip wheel in the fixed position.

13. A vehicle comprising:
a frame;
a pair of drive wheels operatively positioned on opposite sides of the frame;
a seat mounted on the frame;
a drive motor for driving at least one of a pair of drive wheels;
an anti-tip wheel mounted to a suspension member, the suspension member pivotally supported on the frame and having a resilient suspension; and
a retaining system for selectively holding the anti-tip wheel in a fixed position relative to ground on which the drive wheels normally ride, the retaining system comprising a solenoid, and actuation of the solenoid causing engagement and disengagement of a series of intermeshing teeth that fix the position of the suspension member with respect to the frame.

14. The vehicle of claim 13 wherein the solenoid is rotatably attached to a gear shaft having a series of teeth thereon, and the selective actuation of the solenoid causes engagement and disengagement of the gear teeth with a ratchet.

15. A power wheelchair comprising:
a frame;
a seat mounted on the frame;
a pair of drive wheels,
at least one pitch stabilizing wheel;
a motor for controlling and driving each of said drive wheels;
a suspension system pivotally mounting the pitch stabilizing wheel to said frame and enabling resilient translation of said pitch stabilizing wheel relative to said frame, and
a wheel restraint having intermeshing teeth for operatively locking pivotal motion of the pitch stabilizing wheel relative to said frame.

16. The power wheelchair according to claim 15 wherein said suspension system is operatively coupled to the motor and is pivotally responsive to the torque generated by the motor and applied to the corresponding drive wheel.

17. The power wheelchair according to claim 15 wherein the pitch stabilizing wheel is normally positioned off the ground and the wheel restraint is operative to lock said pitch stabilizing wheel at a near ground position.

18. The power wheelchair according to claim 15 wherein said wheel restraint comprises a ratchet having the plurality of teeth and at least one engagement tooth disposed in combination with the suspension system for operatively engaging the teeth of said ratchet, said ratchet and engagement teeth being configured to provide unidirectional retention such that said wheel suspension system is, upon activation, locked in a fixed pivotal position relative to the frame.

19. The power wheelchair according to claim 15 wherein said wheel restraint employs a ratchet having the plurality of teeth, said ratchet disposed in combination with said suspension system, and at least one tooth disposed in combination with said frame and engaging said teeth of said suspension system ratchet, said teeth being configured to provide unidirectional retention such that said wheel is selectively locked at fixed position in response to the torque generated by the motor.

20. The power wheelchair of claim 15 wherein the suspension system comprises an arm pivotably mounted at one end to the frame and the at least one pitch stabilizing wheel positioned at the opposite end thereof.

* * * * *